W. B. DUNNING.
Pipe-Couplings.
No. 143,229.  Patented September 30, 1873.
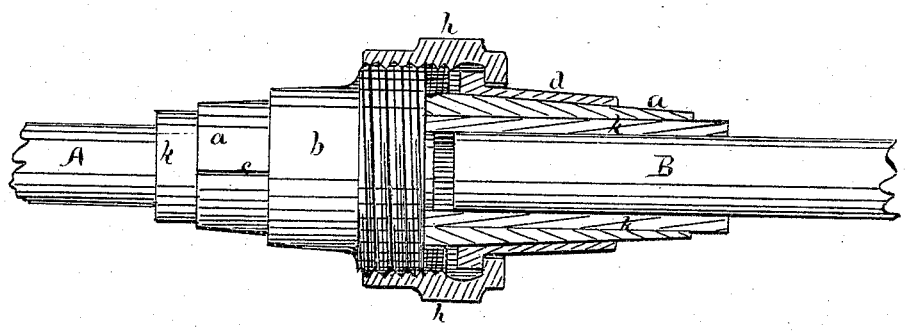

UNITED STATES PATENT OFFICE.

WILLIAM B. DUNNING, OF GENEVA, NEW YORK.

IMPROVEMENT IN PIPE-COUPLINGS.

Specification forming part of Letters Patent No. 143,229, dated September 30, 1873; application filed August 26, 1873.

*To all whom it may concern:*

Be it known that I, WILLIAM B. DUNNING, of Geneva, in the county of Ontario and State of New York, have invented certain Improvements in Pipe-Couplings, of which the following is a specification:

The object of this invention is to provide a simple and cheap "union" or coupling for gas, steam, and water pipes, which may be applied even in long lengths of continuous straight pipe. It consists of an ordinary threaded male and female coupling-collar, which works upon a conical sleeve, divided longitudinally, in connection with a section of rubber or other elastic or flexible hose or tubular packing.

The drawing is a longitudinal sectional view of the two ends of pipe having my invention attached.

It is frequently desirable to connect the ends of metal pipe in situations where it is inconvenient or impossible to cut a thread on them. There are often instances, also, where long lengths of straight pipe are required, and in which the amount of expansion and contraction renders it necessary to provide one or more sliding or compensating joints; and for these purposes my invention is especially adapted.

I provide a conical sleeve, $a$, tapering toward either end. This sleeve may be cut from end to end, as shown at $c$, or it may be divided into two or more parts longitudinally. It might be desirable to bore it out somewhat larger toward the center, so as to insure a bearing at the ends around the pipe when closed together by the collars $b$ and $d$. These collars are bored out to correspond with the conical shape of the sleeve. The collar $d$ is flanged to receive the threaded coupling-ring $h$, to which it is swiveled, as shown, and said ring $h$ screws upon the threaded section of collar $b$. The joint between the ends of the pipe A and B is thoroughly packed by means of the section $k$ of rubber or other suitable tubular packing. The ends of the pipe are thrown out of line, and the sleeve $a$, containing the tubing $k$, and upon which the collars $b$ and $d$ and the ring $h$ have been placed, is applied to one end, when the pipe is again put in line, and the rubber tube and other parts are slid over the joint, so as to overlap the two ends of the pipe about equally. The screw coupling-ring $h$ is then screwed up, drawing the two collars $b$ and $d$ together upon the inclined surfaces of the conical sleeve, thereby compressing it firmly upon the packing $k$.

I claim—

A pipe-coupling or union embracing in its organization a tubular packing, $k$, conical sleeve $a$, collars $b$ and $d$, and coupling-ring $h$, operating conjointly substantially in the manner and for the purposes set forth.

WM. B. DUNNING.

Witnesses:
JOHN E. BEAN,
H. BEAN.